(12) United States Patent
Andersen

(10) Patent No.: US 6,778,659 B2
(45) Date of Patent: Aug. 17, 2004

(54) CUSTOMER SERVICE ROUTING SYSTEM AND METHOD

(75) Inventor: Meredith J. Andersen, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 317 days.

(21) Appl. No.: 09/792,857

(22) Filed: Feb. 23, 2001

(65) Prior Publication Data

US 2002/0118815 A1 Aug. 29, 2002

(51) Int. Cl.[7] .............................................. H04M 5/00
(52) U.S. Cl. ........................ 379/265.02; 379/93.12; 379/265.09
(58) Field of Search ..................... 379/88.17, 88.18, 379/93.01, 93.12, 201.01, 211.02, 212.01, 213.01, 214.01, 265.01, 265.02, 265.09, 900, 265.12, 265.13

(56) References Cited

U.S. PATENT DOCUMENTS

| | | | | |
|---|---|---|---|---|
| 5,724,092 A | * | 3/1998 | Davidsohn et al. | 348/14.01 |
| 5,729,693 A | * | 3/1998 | Holda-Fleck | 705/14 |
| 5,937,051 A | * | 8/1999 | Hurd et al. | 379/212.01 |
| 5,978,467 A | * | 11/1999 | Walker et al. | 379/266.01 |
| 6,064,730 A | * | 5/2000 | Ginsberg | 379/265.09 |
| 6,069,941 A | * | 5/2000 | Byrd et al. | 379/121.06 |
| 6,385,646 B1 | * | 5/2002 | Brown et al. | 709/217 |
| 6,404,875 B2 | * | 6/2002 | Malik et al. | 379/211.03 |
| 6,560,329 B1 | * | 5/2003 | Dragnich et al. | 379/265.02 |
| 6,651,053 B1 | * | 11/2003 | Rothschild | 707/3 |

* cited by examiner

Primary Examiner—Bing Q. Bui

(57) ABSTRACT

The present disclosure relates to a customer service routing system and method. The routing system is configured for receiving an incoming service inquiry from a customer, prompting the customer to input a product serial number, receiving the serial number input by the customer, and directing the customer inquiry to a customer service representative based upon the customer response.

21 Claims, 4 Drawing Sheets

CUSTOMER SERVICE ROUTING SYSTEM AND METHOD

FIELD OF THE INVENTION

The present disclosure relates to a customer service routing system and method. More particularly, the disclosure relates to a simplified customer service routing system and method that reduces the amount of time and effort spent by a customer before reaching an appropriate customer service representative.

BACKGROUND OF THE INVENTION

Customers of computer and peripheral equipment are often provided with troubleshooting tips in the documentation accompanying the purchased equipment that aid the customer in overcoming problems he or she is having with the equipment. Where the customer cannot solve the problem after having consulted the troubleshooting tips, the customer normally can call a customer service line to receive help from a customer service representative.

Often times, the equipment vendor sells many different products. Because of this fact, many vendors employ customer service representatives trained as to particular products or product lines only. To ensure the customer reaches a customer service representative knowledgeable about the particular product about which the customer is calling, equipment vendors frequently use call routing systems. Common routing systems are used to obtain preliminary information from the customer about the product(s) about which the customer is calling. By way of example, the routing system may play recorded questions for the customer that prompt the customer for particular information about the product at issue. The customer can respond to the questions by entering numbers on his or her telephone keypad that are received by the routing system. Typically, the questions are directed questions in the form of "If you are calling about [product 1], press one. If you are calling about [product 2], press 2" and so forth. Once the customer responses are received, they are used to route the call to an appropriate customer service representative.

In many current routing systems, the customer is required to answer many different questions before he or she can reach a live human being to discuss the problem being experienced. Often, the customer will not know the answer to one or more of the questions and will have to terminate the call, find the answer(s) to the question(s), and call again, starting from the beginning of the routing process. Understandably, this routing process can be very frustrating for the customer, particularly where it takes several minutes or even several calls before the customer can reach a live human being. Accordingly, it can be appreciated that it would be desirable to have a simplified customer service routing system and method that reduces the amount of time and effort spent by a customer before reaching an appropriate customer service representative.

SUMMARY OF THE INVENTION

The present disclosure relates to a customer service routing system and method. The routing system is configured for receiving an incoming service inquiry from a customer, prompting the customer to input a product serial number, receiving the serial number input by the customer, and directing the customer inquiry to a customer service representative based upon the customer response.

In view of this functionality, the routing system can be described as comprising means for receiving an incoming service inquiry from a customer, means for prompting the customer to input a product serial number, means for receiving the serial number input by the customer, and means for directing the customer inquiry to a customer service representative based upon the customer response.

Alternatively, the routing system can be described as comprising logic configured to receive an incoming service inquiry from a customer, logic configured to prompt the customer to input a product serial number, logic configured to receive the serial number input by the customer, and logic configured to direct the customer inquiry to a customer service representative based upon the customer response.

The features and advantages of the invention will become apparent upon reading the following specification, when taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
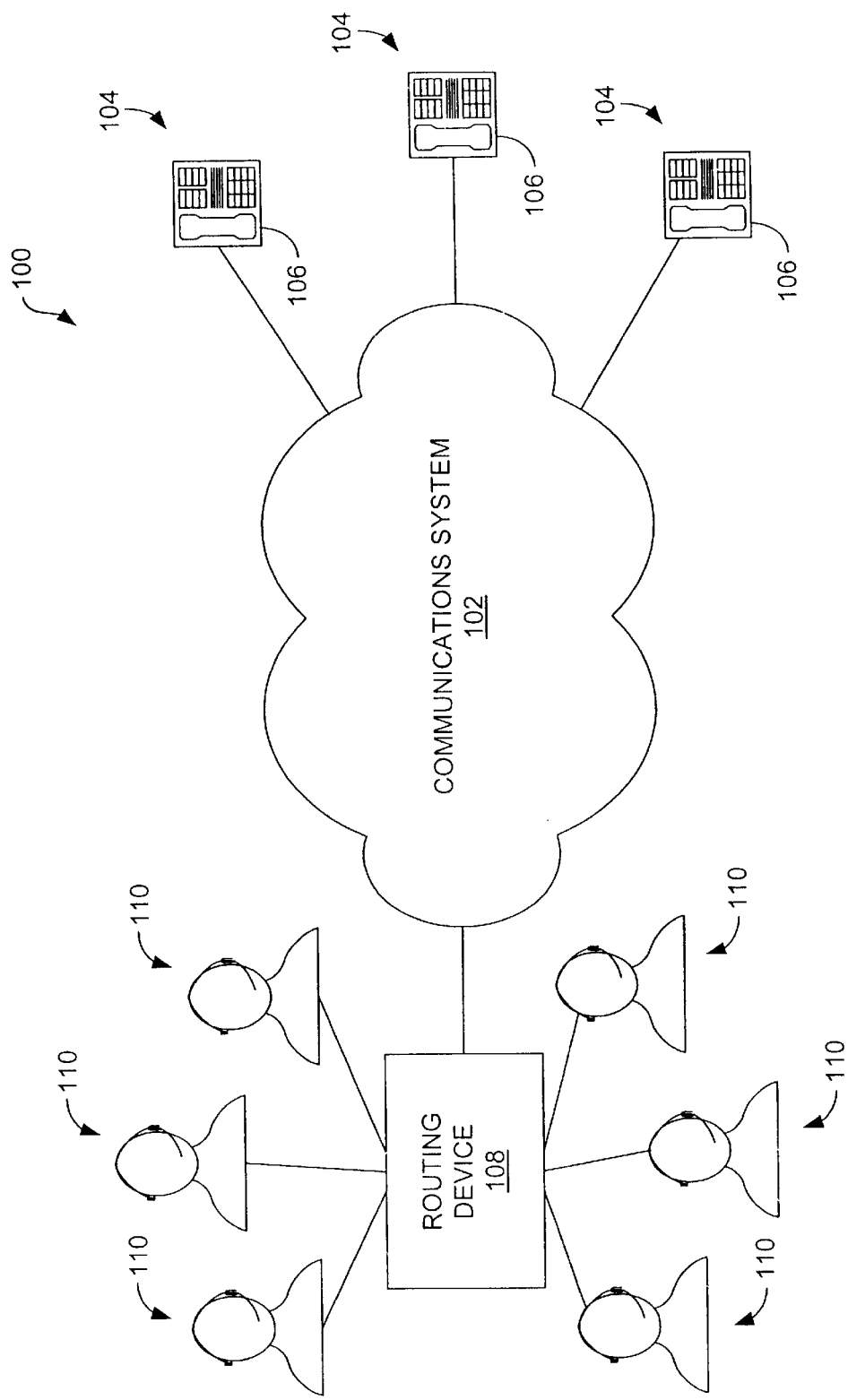
FIG. 1 is a schematic view of a customer service routing system of the present invention.

Referring now in more detail to the drawings, in which like numerals indicate corresponding parts throughout the several views, FIG. 1 illustrates a customer service routing system 100 of the present invention. As indicated in this figure, the system 100 includes a communications system 102 to which a customer can connect with a customer interface device 104. By way of example, the customer interface device 104 can comprise a telephone 106 and the communications system 102 can comprise a telephone network. Although use of a telephone and telephone network are preferred, it is to be understood that the customer interface device 104 can comprise an alternative device such as a personal computer (PC) and the communications system 102 can comprise an alternative system such as the Internet.

Also connected to the communications system 102 is a customer service routing device 108 of the equipment vendor. Although the present system and method are described in the context of an equipment vendor, it will be understood that the concepts disclosed herein are equally applicable to other business concerns that desire to route incoming customer communications. Typically, the routing device 108 comprises a computer system that operates appropriate software/firmware adapted to field customer communications and, based upon these communications, route the customer to the appropriate representative. In addition, the routing device 108 normally also comprises device memory in which customer responses can be stored. As is further indicated in FIG. 1, the routing device 108 is connected to a plurality of customer service representatives 110 that possess knowledge of one or more products sold by the vendor.

Figure 2:
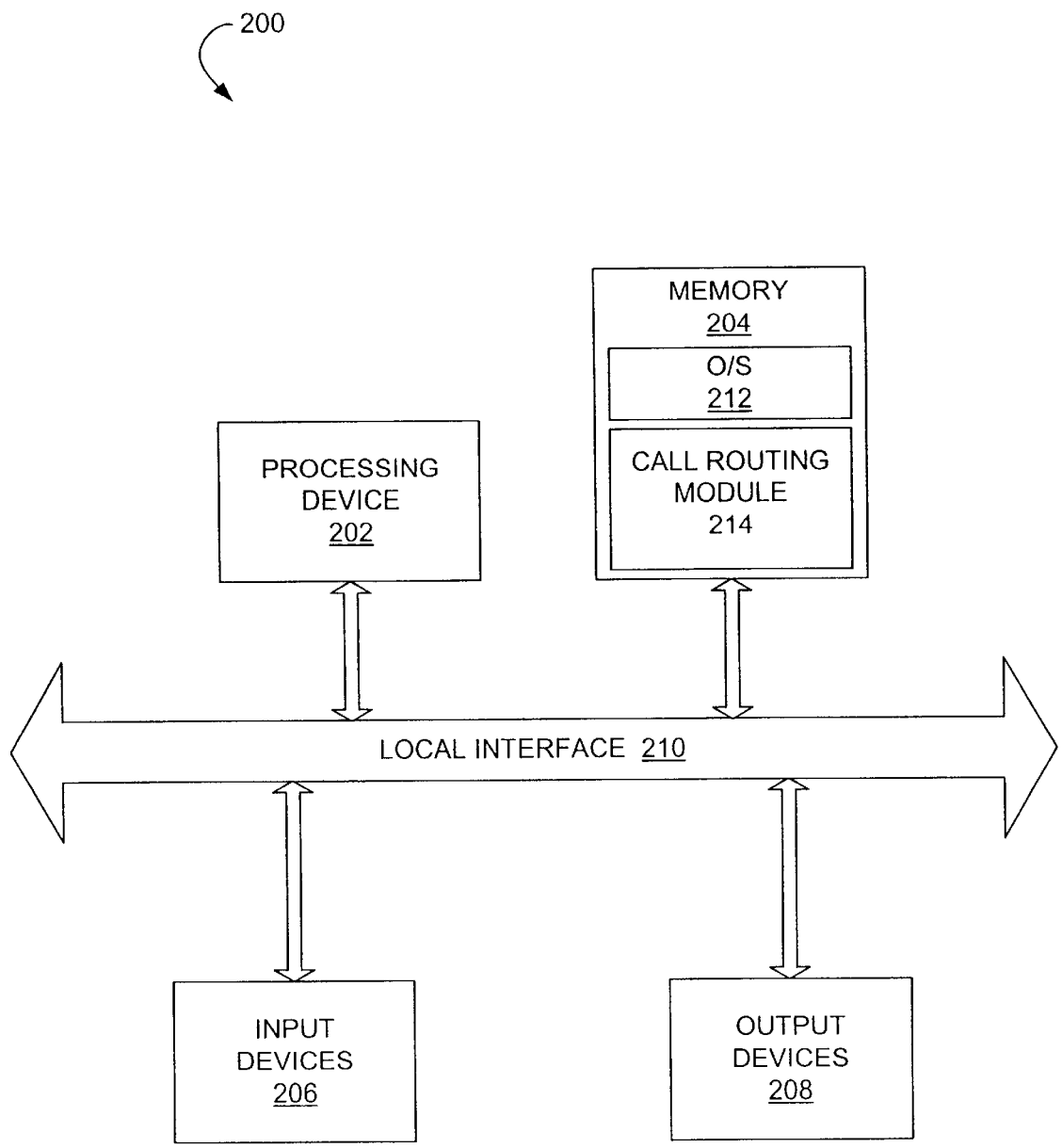
FIG. 2 is a schematic view of computing device architecture used in the routing system shown in FIG. 1.

FIG. 2 illustrates an example the architecture of a computing device 200 suitable for this purpose. As indicated in this figure, the computer system 200 can comprise part of the routing device 108. The computer system 200 normally includes a processing device 202, memory 204, input devices 206, output devices 208, and a local interface 210 with which each of the other components are in communication. By way of example, the processing device 202 can comprise one or more computer processor units (CPUs). The memory 204 normally comprises random access memory (RAM) as well as storage memory (e.g., one or more hard disks or other storage media) that, at least temporarily, store data within the computing device 200. The input devices 206 typically comprise conventional user interface devices such a keyboard, mouse, and like with which a user (e.g., a system administrator) can operate and control the system 100. In addition, these input devices 206 normally include conventional interface elements through which data can be received by the system host from a system user. Similarly, the output devices 208 normally include conventional interface elements through which data can be transmitted to a system user.

The memory 204 typically stores data conventionally held in computer memory including an operating system (O/S) 212. In addition, the memory 204 also stores the necessary commands for a call routing module 214. This module 214 preferably comprises software and/or firmware to direct calls based upon predetermined criteria. Where the call routing module 214 is implemented in software stored in computer memory, it will be understood that the modules can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 3A:
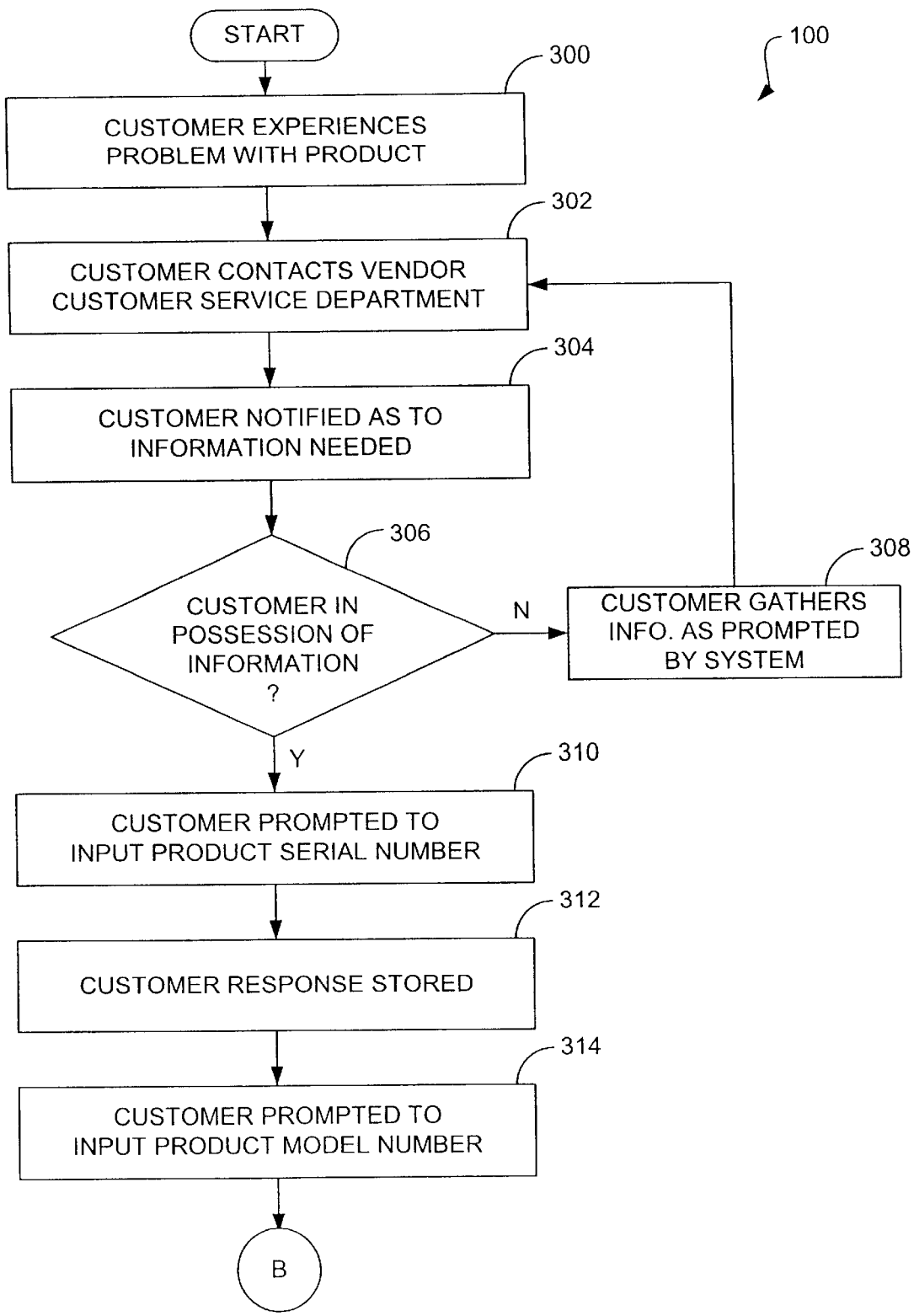
FIGS. 3A and 3B are flow diagrams that illustrate a method for routing customers to appropriate customer service representatives using the routing system shown in FIG. 1.
Figure 3B:
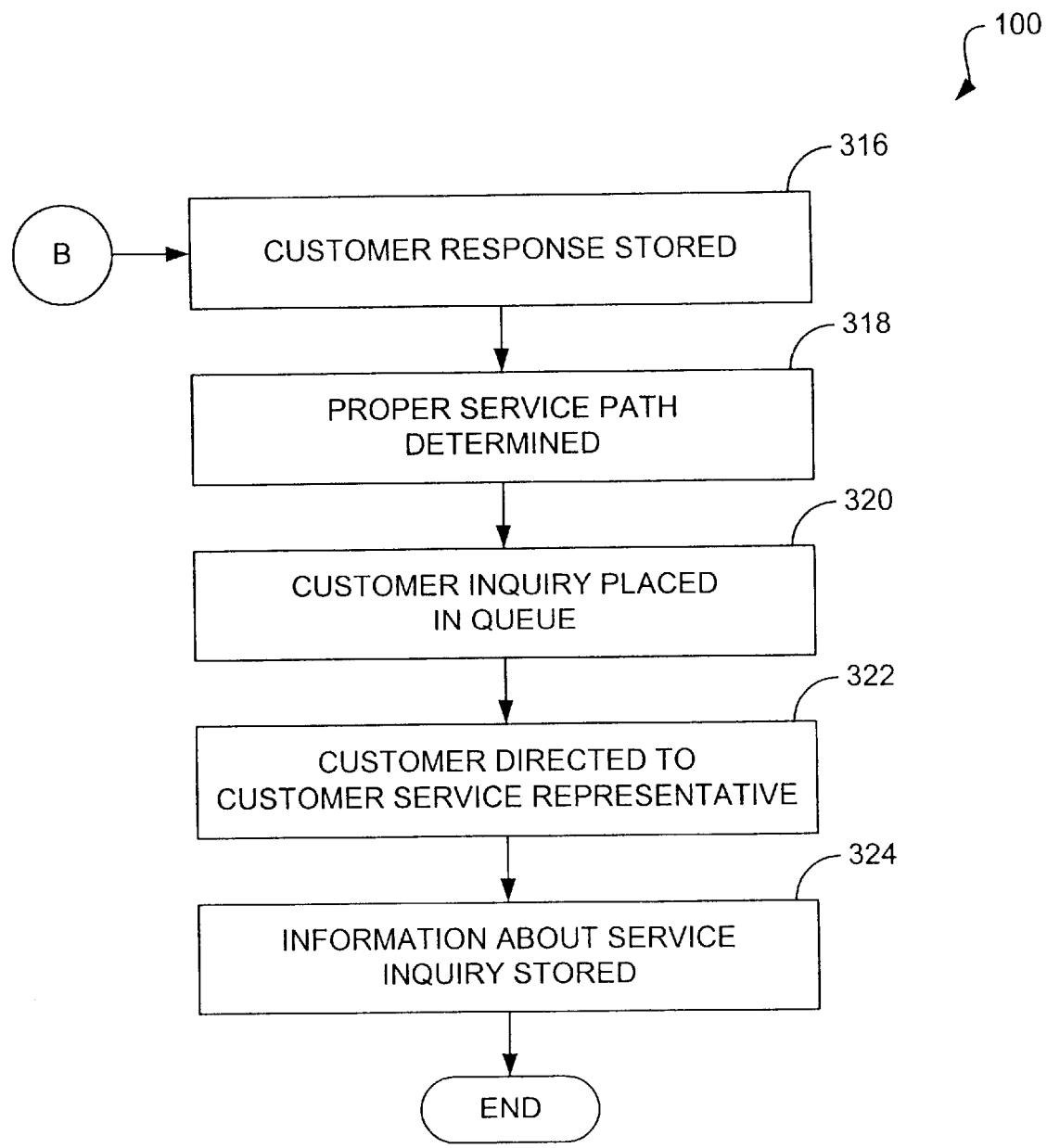

As identified above, current customer routing systems normally require multiple inputs from the customer and may request information that the customer does not possess at the time. Accordingly, the overlying principle of the present invention is to simplify the process to more rapidly service the customer. FIGS. 3A and 3B provide an example method for routing customer service communications using the system 100 shown in FIG. 1. As indicated in FIG. 3A, if the customer has a problem with one or more of the vendor's products, as indicated in block 300, the customer can contact the vendor's customer service department, as indicated in block 302. As identified above, the customer normally contacts the vendor via the telephone, although alternative means of communication are feasible, such as various communications means operating over the Internet.

Once the customer has contacted the customer service department, for instance by calling a customer service line, the customer is notified that certain pieces of information will be needed to route the customer's inquiry, as indicated in block 304. By way of example, the customer routing device 108 can notify the customer that the product serial number and model number will be needed. In addition, the routing device 108 can notify the customer where to find the needed information. For instance, the routing device 108 can notify the customer that the information can be obtained by locating the information on the product housing or, where applicable, printing a test page for the product with which the customer is having difficulty. Such a test page normally includes other information that may be useful to the customer service representative once the customer reaches the representative through the system 100.

At this point, the customer can determine whether he or she knows the information that will be needed to route the customer's inquiry, as indicated at decision element 306. If the customer does not know the needed information, he or she can terminate the communication and, as indicated in block 308, collect the needed information so that he or she will have this information at the ready when the customer again contacts the customer service department at block 302. If, on the other hand, the customer knows the information identified by the routing device 108, the customer can be prompted to input the serial number of the product about which the customer is inquiring, as indicated in block 310. Where the customer has accessed the routing device via telephone, this step can be accomplished by entering the various numeric digits of the serial number with his or her telephone keypad. Optionally, the customer can also be prompted to enter the alphabetic portion of the serial number also with the telephone keypad.

After the serial number has been input by the customer, the customer service routing device 108 stores the customer response, as indicated in block 312. In a preferred embodiment, the response is both stored and forwarded to the ultimately selected customer service representative to help the representative in diagnosing and solving the customer's problem. Next, the customer can be prompted for further information about the product at issue. For instance, as indicated in block 314, the customer can be prompted to enter the product model number. The customer can input his or her response in the manner described above. Again, the customer response is stored by the routing device 108, as indicated in block 316 of FIG. 3B. Typically, these two pieces of information, i.e., the product serial number and model number, is all of the information the routing device 108 needs to determine the product about which the customer is inquiring. It is to be understood, however, that other or additional information could be collected, if desired. In addition, where the customer has registered with the vendor or contacted the customer service department before, the information supplied by the customer may be enough for the routing device 108 to determine the level of the customer's entitlement to support.

At this point, the routing device 108 determines the routing path for the customer inquiry, as indicated in block 318. The customer is then placed in a queue in which the customer will wait for the next available customer service representative knowledgeable about the product with which the customer is having problems, as indicated in block 320. Once an appropriate customer service representative is available, the customer will be directed to the customer service representative, as indicated in block 322. Due to the responses the customer has entered during the routing process, the customer service representative will preferably already know what product about which the customer is concerned. In addition, the customer service representative may already know information about the customer including his or her entitlement to service, the customer's product history, and the like. Optionally, the customer service representative can be a "technical screener" who determines the nature of the problem and then directs the customer to the representative best equipped to solve the customer's problem.

Once having accessed the customer service representative, the customer can receive help from the customer service representative. Normally, the customer service representative's instructions will be adequate to remedy the customer's problem. Where mere instructions from the customer service representative are not enough, however, the representative can create a customer service order (CSO) to arrange for a technician to visit the customer's premises to or send a user-installable part to the customer to solve the problem. At this point, information about the customer's problem and the recommended solution can be stored in a database of the routing device 108 for the vendor's records, as indicated in block 324. With these records, the vendor will be better suited to help the customer in the future if new customer problems/inquiries should arise. The customer service communication is terminated.

Operating in the manner described above, the present invention provides a greatly simplified means for a customer to receive customer service with much less frustration. While particular embodiments of the invention have been disclosed in detail in the foregoing description and drawings for purposes of example, it will be understood by those skilled in the art that variations and modifications thereof can be made without departing from the scope of the invention as set forth in the following claims.

What is claimed is:

1. A method for customer service routing including a computer readable medium, comprising:
   receiving an incoming service inquiry from a customer;
   prompting the customer to electronically input a product serial number;
   receiving the serial number input by the customer; and
   automatically directing the customer inquiry without human intervention to a customer service representative based upon the customer response without breaking communication with the customer.

2. The method of claim 1, further comprising the steps of prompting the customer to electronically input a product model number and automatically directing the customer inquiry based upon the serial number and model number electronically input by the customer.

3. The method of claim 1, further comprising the step of, prior to prompting the customer to electronically input a product serial number, notifying the customer of the information that will be needed to direct the customer inquiry.

4. The method of claim 1, further comprising the step of, prior to prompting the customer to electronically input a product serial number, notifying the customer to print out a test page relevant to the product.

5. The method of claim 1, further comprising the step of automatically relaying the response input by the customer to the customer service representative without human intervention.

6. The method of claim 1, wherein the step of receiving the serial number electronically input by the customer comprises the step of receiving numbers entered by the customer through a telephone keypad.

7. The method of claim 1, wherein the step of receiving the serial number electronically input by the customer comprises the step of receiving numbers transmitted by the customer via the Internet.

8. A system for customer service routing, comprising:
   means for receiving an incoming service inquiry from a customer;
   means for prompting the customer to input a product serial number;
   means for receiving the serial number electronically input by the customer; and
   means for automatically directing the customer inquiry without human intervention to a customer service representative based upon the customer response without breaking communication with the customer.

9. The system of claim 8, further comprising means for prompting the customer to input a product model number and means for automatically directing the customer inquiry based upon the serial number and model number electronically input by the customer.

10. The system of claim 8, further comprising means for notifying the customer of the information that will be needed to direct the customer inquiry.

11. The system of claim 8, further comprising means for notifying the customer to print out a test page relevant to the product.

12. The system of claim 8, further comprising means for automatically relaying the response input by the customer to the customer service representative without human intervention.

13. The system of claim 8, wherein the means for receiving the serial number electronically input by the customer comprises means for receiving numbers entered by the customer through a telephone keypad.

14. The system of claim 8, wherein the means for receiving the serial number electronically input by the customer comprises means for receiving numbers transmitted by the customer via the Internet.

15. A system for customer service routing, comprising:
   logic configured to receive an incoming service inquiry from a customer;
   logic configured to prompt the customer to input a product serial number;
   logic configured to receive the serial number electronically input by the customer; and
   logic configured to automatically direct the customer inquiry without human intervention to a customer service representative based upon the customer response without breaking communication with the customer.

16. The system of claim 15, further comprising logic configured to prompt the customer to electronically input a product model number and logic configured to automatically direct the customer inquiry based upon the serial number and model number electronically input by the customer.

17. The system of claim 15, further comprising logic configured to notify the customer of the information that will be needed to direct the customer inquiry.

18. The system of claim 15, further comprising logic configured to notify the customer to print out a test page relevant to the product.

19. The system of claim 15, further comprising logic configured to automatically relay the response input by the customer to the customer service representative without human intervention.

20. The system of claim 15, wherein the logic configured to receive the serial number input by the customer comprises logic configured to receive numbers entered by the customer through a telephone keypad.

21. The system of claim 15, wherein the logic configured to receive the serial number electronically input by the customer comprises logic configured to receive numbers transmitted by the customer via the Internet.

* * * * *